United States Patent [19]

Banks

[11] Patent Number: 5,400,985

[45] Date of Patent: Mar. 28, 1995

[54] AIRPLANE ESCAPE SLIDE SYSTEM AND ROTATIONAL GIRT BAR THEREFOR

[75] Inventor: Eddie D. Banks, Renton, Wash.

[73] Assignee: The Boeing Company, Seattle, Wash.

[21] Appl. No.: 20,970

[22] Filed: Feb. 22, 1993

[51] Int. Cl.$^6$ ............................................. B64D 25/14
[52] U.S. Cl. ................................ 244/137.2; 244/905; 193/25 B; 182/48
[58] Field of Search ........................... 244/905, 137.2; 193/25 B; 182/48

[56] References Cited

U.S. PATENT DOCUMENTS

| 4,125,235 | 11/1978 | Fitzgerald et al. | 244/905 |
| 4,375,877 | 3/1983 | Shorey | 244/137.2 |
| 4,715,562 | 12/1987 | Bokalot | 244/905 |

*Primary Examiner*—David A. Bucci
*Assistant Examiner*—Anne E. Bidwell
*Attorney, Agent, or Firm*—Robert H. Sproule

[57] ABSTRACT

An emergency escape slide for a commercial passenger airplane includes a girt bar which connects the slide to the airplane. The girt bar includes a middle portion having a rectangular cross section to which the slide is connected, and cylindrical end fittings which are attached to opposite ends of the middle portion. When the escape slide is armed, the cylindrical end fittings are positioned within floor mounted receptacles which permit the end fittings to rotate. Thus, when the escape slide is deployed, the girt bar is permitted to rotate so that the wide axis of the girt bar remains aligned with the loads generated by the slide deployment. In this manner, the strongest portion of the girt bar is in position to react the loads.

4 Claims, 5 Drawing Sheets

AIRPLANE ESCAPE SLIDE SYSTEM AND ROTATIONAL GIRT BAR THEREFOR

TECHNICAL FIELD

The present invention pertains to a girt bar for an airplane passenger emergency escape slide.

BACKGROUND OF THE INVENTION

In the event of an onground emergency aboard a large commercial passenger airplane which is away from the airport terminal boarding gate, emergency escape slides are typically used to evacuate the passengers and crew from the airplane cabin to the ground. These escape slides are stored inside the passenger doors of the airplane. Prior to normal operations for embarking and disembarking passengers at the airport terminal gate, the emergency escape slides are disarmed by the cabin flight attendants. This allows the cabin doors to be opened and closed in a normal manner without activating the emergency escape slides.

However, once the airplane leaves the airport terminal gate, the emergency escape slides are armed. Arming the emergency escape slides causes a metal girt bar attached to the girt at the upper end of each slide to be connected to the floor of the airplane cabin. In the event of a situation requiring emergency evacuation of the passengers from the airplane, current Federal Aviation Regulations require that each emergency escape slide be deployed by moving the door handle connected to the inside of the cabin door to the open position. This causes (i) the cabin door to open (on some airplanes the door must be manually pushed open), and (ii) the uninflated escape slide to fall from its storage pack inside the cabin door and to begin inflating outside the airplane. Since the upper end of the inflating escape slide is attached to the girt bar, the escape slide remains connected to the airplane.

During inflation, the escape slide has a tendency to pop open thereby resulting in a significant upward force being applied to the girt bar. This upward force can damage the girt bar thereby reducing its ability to effectively secure the slide to the airplane unless the girt bar is sufficiently heavy to withstand the vertical loads.

SUMMARY OF THE INVENTION

The present invention pertains to an emergency escape slide system for an airplane. The system includes an escape slide having an upper end and a lower end. In addition, there is an attachment bar which has a first axis and a second axis which is perpendicular to the first axis. The attachment bar is connected to the upper end of the escape slide. The attachment bar includes a middle section having (i) a first portion which has a substantial alignment component which is parallel to the first axis and which has a first dimension, and (ii) a second portion which has a substantial alignment component which is parallel to the second axis and which has a second dimension which is smaller than the first dimension. In addition, the attachment bar has first and second end sections which are attached to opposite ends of the middle section. Furthermore, the present invention includes means, connected to the airplane, for engaging the first and second end sections so as to attach the attachment bar to the airplane in a manner such that when the escape slide is subjected to a force during deployment of the escape slide from the airplane, the attachment bar is permitted to rotate about the first axis such that first alignment component of the attachment bar is generally aligned with the force.

DETAILED DESCRIPTION

Figure 1:
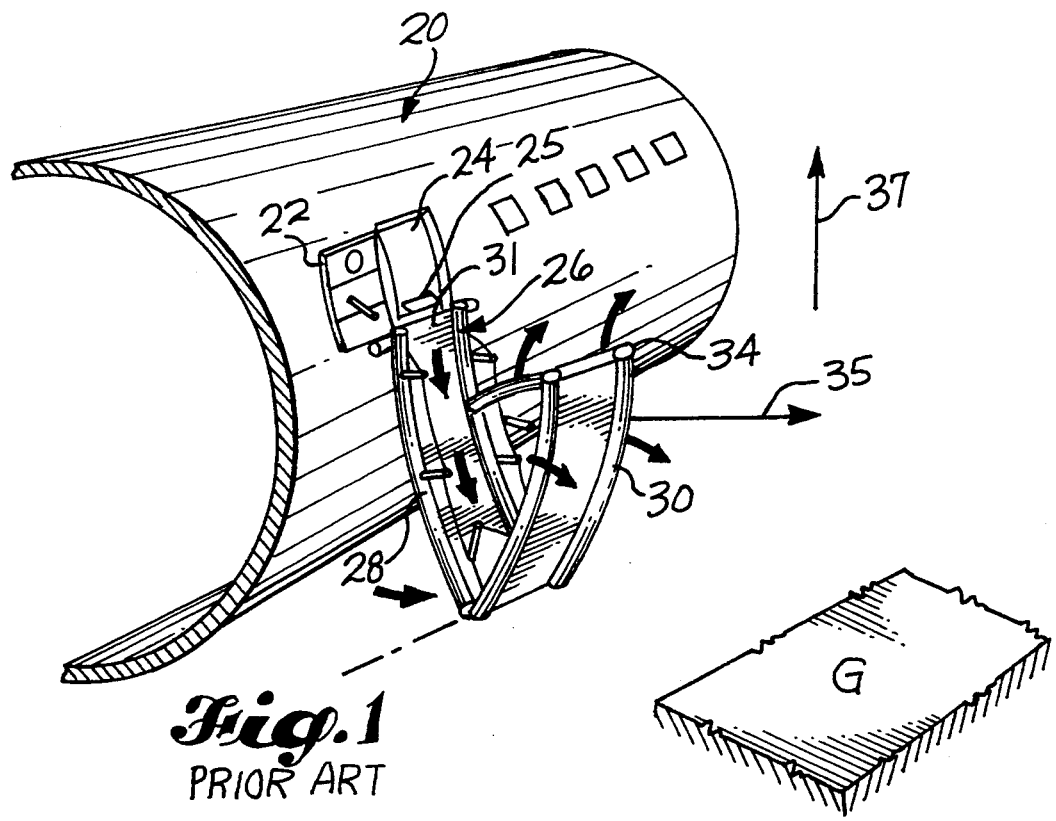
FIG. 1 is a partial perspective view of an airplane having connected thereto a partially inflated conventional emergency escape slide.

Before proceeding with a detailed description of the present invention, additional background to the invention will be provided. Referring first to FIG. 1, there is shown a portion of an airplane fuselage indicated at 20 having a cabin door 22 for a door opening 24. Connected to the bottom of the opening 24 at a floor 25 of the airplane's cabin is the top end of an inflatable emergency escape slide indicated at 26 having an upper half section 28 and a lower half section 30 which are attached together along a hinge line represented by a line designated by a number 32.

During a first portion of the slide inflation sequence, the slide is in a vertical position with the slide lower half 30 being attached in an adjacent and parallel manner to the slide upper half 28 by hook and loop fasteners(not shown). Later on during the inflation sequence, an upper end 34 of the slide lower half 30 begins to separate from the slide upper half 28 so that the slide straightens out with the slide upper half being longitudinally aligned with the slide lower half as shown in FIG. 2.

Figure 2:
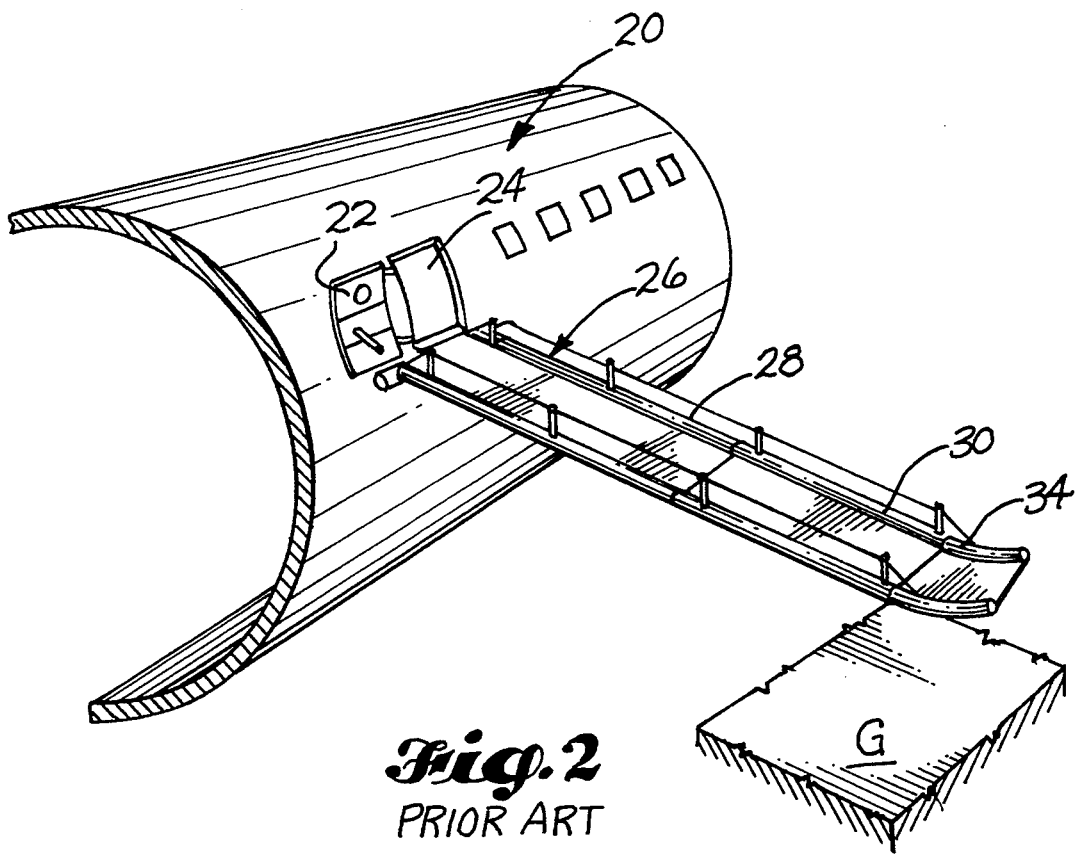
FIG. 2 is a partial perspective view of an airplane having connected thereto a fully inflated conventional emergency escape slide with its lower end located above the ground.
Figure 3:
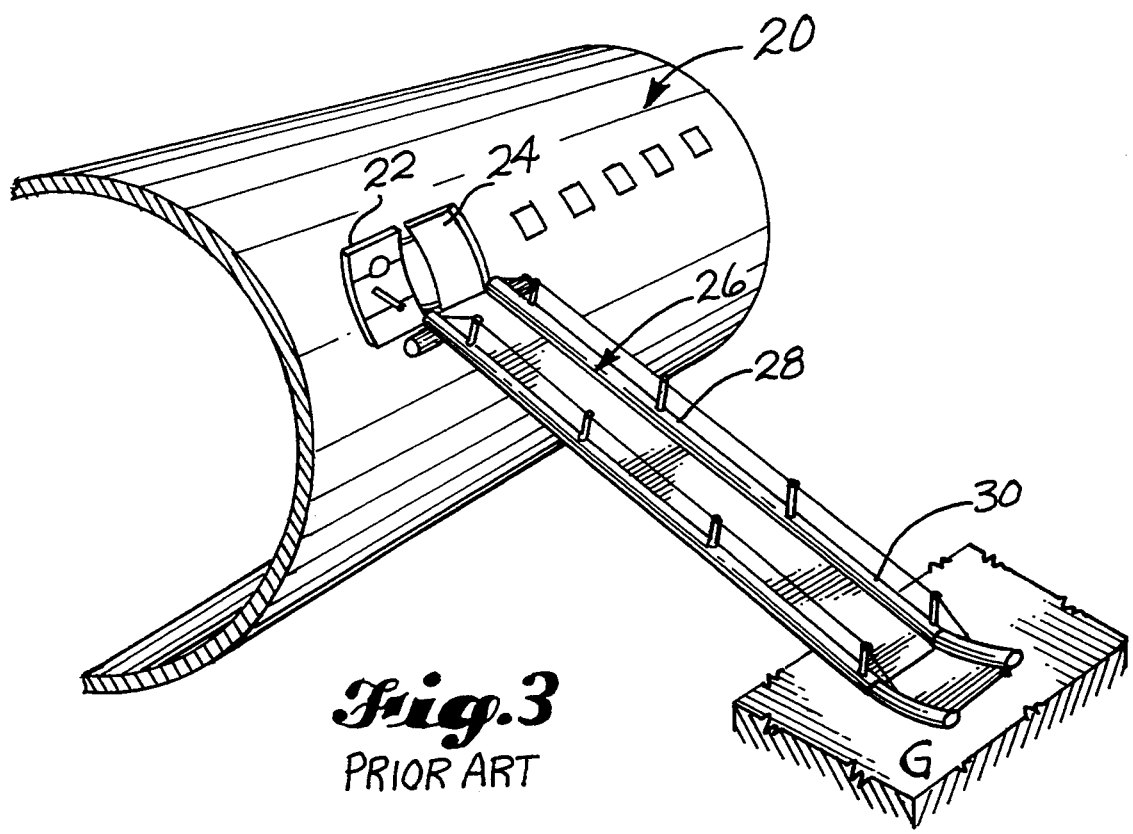
FIG. 3 is a partial perspective view of an airplane having connected thereto a fully inflated conventional emergency escape slide with its lower end resting on the ground.

More particularly, as shown in FIG. 1, during movement of the upper end of the slide lower half away from the slide upper half, a middle portion of the slide centered at the hinge line 32 is caused to move abruptly (pop open) in an upward direction to the position shown in FIG. 2 and in this position a lower end 34 of the slide is above the ground. This abrupt upward movement of the slide middle portion produces a large load force at the upper end of the slide where it is connected to the airplane by means of a girt bar indicated at 36 in FIGS. 4–7. This force has substantial force components in the upward and rightward directions (when viewing FIG. 1). That is, during initial deployment, the load forces are primarily in a rightward direction as indicated by an arrow 35 in FIG. 1. However, as the slide deploys, the rightward force component decreases and an upward force component (indicated by an arrow 37) increases until most of the load forces are in the upward direction. At the end of the inflation sequence, the lower end 34 of the escape slide rests on the ground G as shown in FIG. 3.

Figure 4:
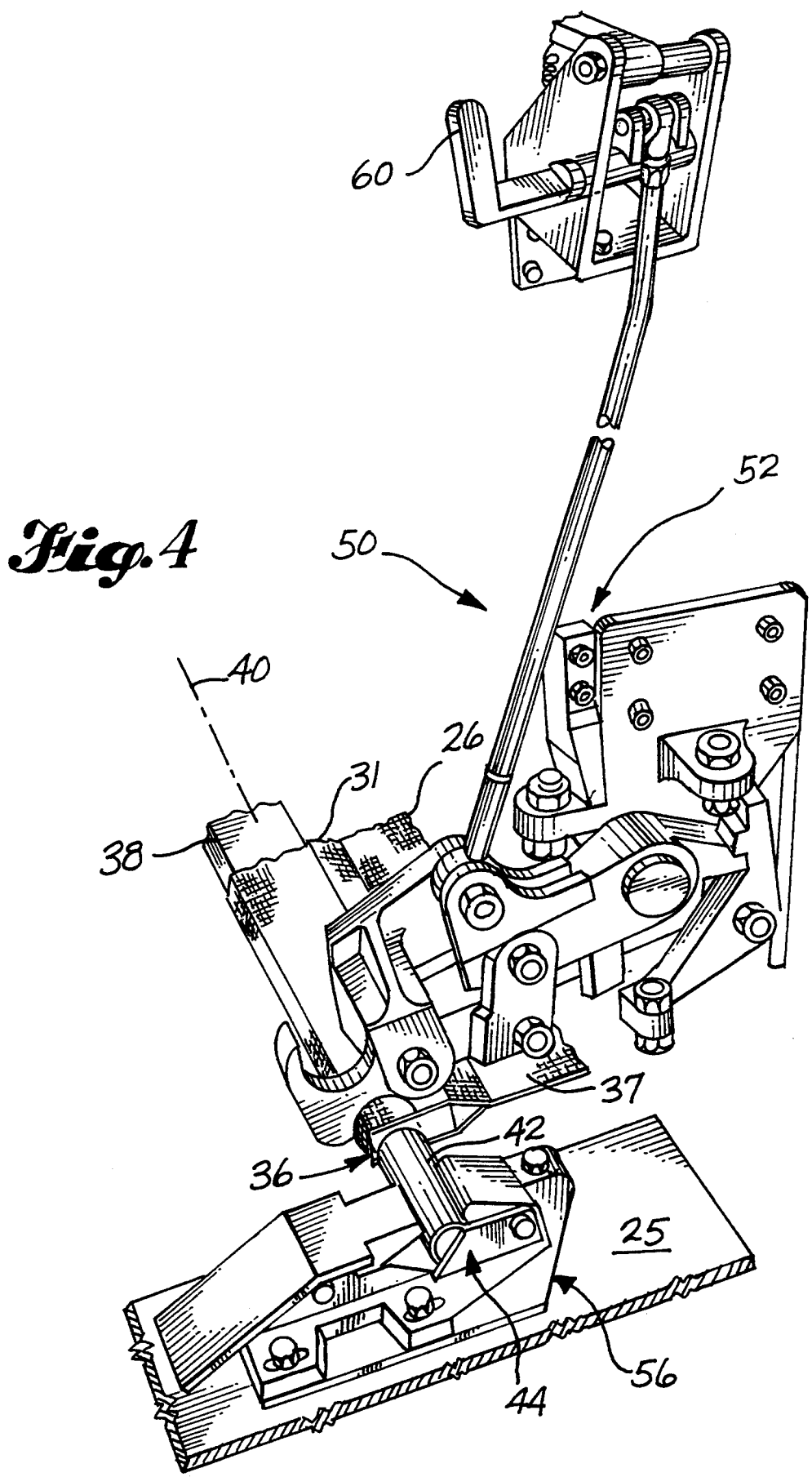
FIG. 4 is a perspective view of a conventional emergency escape slide arming system, which includes an exemplary girt bar of the present invention, in an "armed" mode.
Figure 6:
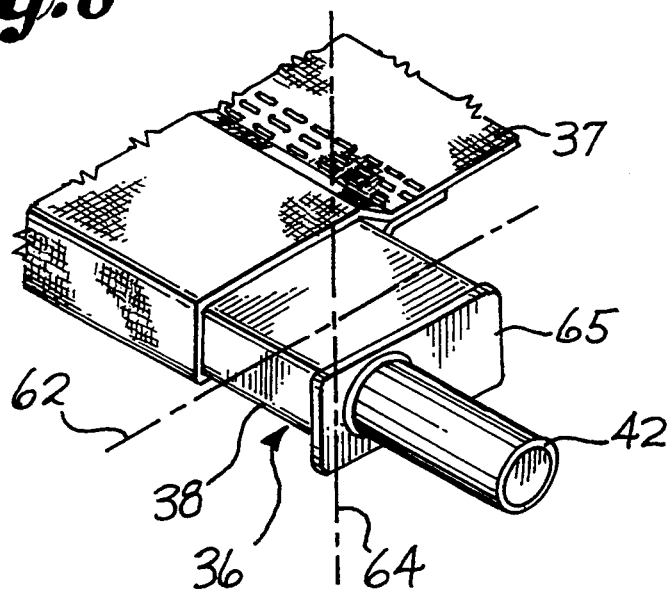
FIG. 6 is a perspective view of the exemplary girt bar of the present invention.

As shown more clearly in FIGS. 4 and 6, an exemplary girt bar 36 of the present invention includes a long middle portion 38 having a rectangular cross section and a lengthwise axis designated by a line 40 and having at its opposite ends cylindrical end fittings 42 (only one of which is shown) which are parallel to the lengthwise axis of the girt bar. As shown in FIG. 4, each of the cylindrical end fittings 42 is secured to the cabin floor 25 by means of a restraining mechanism indicated at 44.

Figure 5:
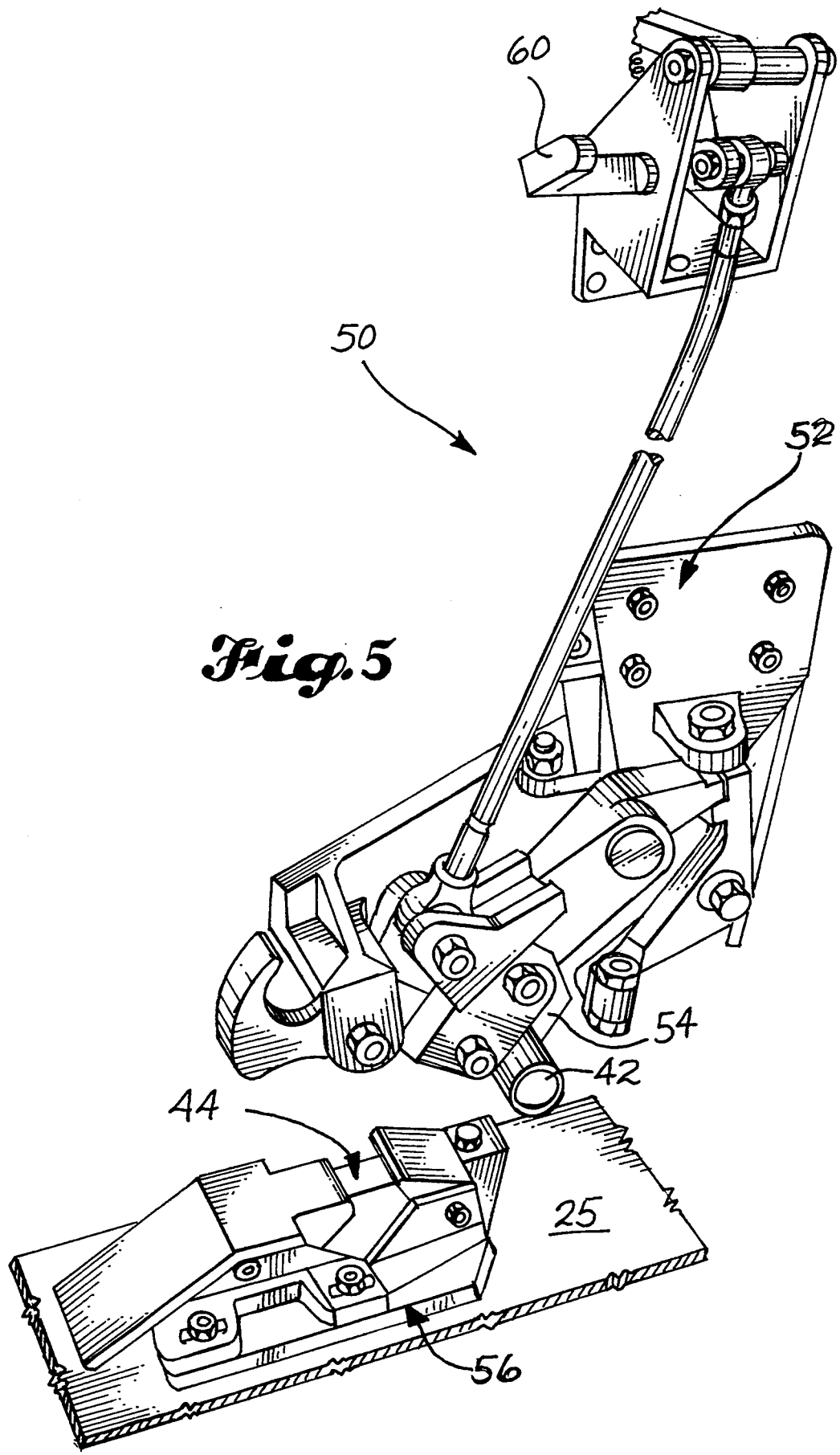
FIG. 5 is a perspective view of the system shown in FIG. 5 showing the system in a "disarmed" mode.

The upper end 37 (girt) of the escape slide 26 is made of a fabric which is looped around the middle portion 38 (FIG. 6) of the girt bar. In some conventional girt bars, the abrupt upward movement of the middle portion of the escape slide 26 during deployment produces an upward force against the girt bar middle portion 38, which in turn causes the girt bar middle portion to bend at its center in an upward direction. This upward bending can cause the girt bar end fittings 42 to be pulled from the restraining mechanism 44 (FIG. 6) thereby resulting in the upper end 31 of the slide being disconnected from the airplane By way of further explanation, the emergency escape slide system includes conventional arming/disarming mechanisms indicated at 50 in FIGS. 4 and 5 (only one of which is shown), including an upper portion indicated at 52 having a hook 54 (FIG. 5) which holds the cylindrical portion 42 of the girt bar when the escape system is in the disarmed mode as shown in FIG. 5. This allows the cabin door to be opened and closed without activating the escape slide.

The arming/disarming mechanism 50 also includes a lower portion 56 which is anchored to the cabin floor 25 and which includes the restraining mechanism 44 which grasps the girt bar end portion 42 in the manner shown in FIG. 4 when the escape system is in the armed mode in accordance with the proper positioning of an escape system mode select handle 60.

Figure 7:
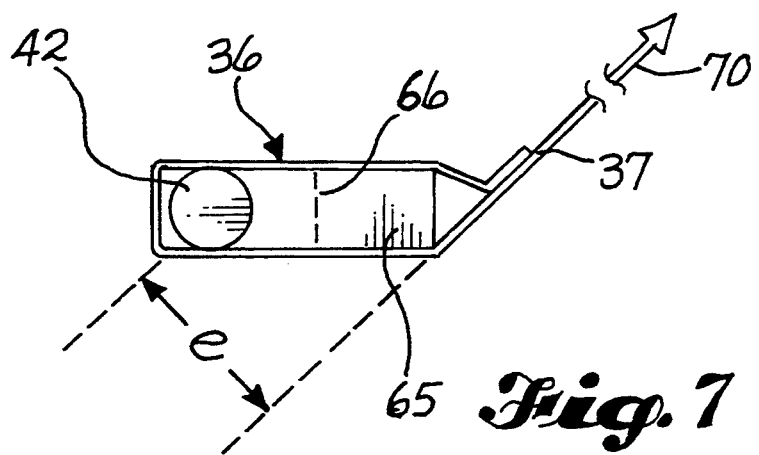
FIG. 7 is an end view of the girt bar shown in FIG. 6.

As shown in FIGS. 6 through 7, the girt bar 36 has a rectangular cross-section including a wide axis designated by a line 62 and a narrow axis designated by a line 64. The girt bar 36 is required to be of minimal height to avoid interfering with foot traffic entering and exiting through the cabin doorway. After deployment of the slide and during evacuation using the slide, it is desirable that the wide axis 62 of the slide be parallel to the cabin floor. However, it has been discovered that during deployment of the slide, large upward load forces were transmitted to the girt bar in a manner generally perpendicular to the wide portion 62 of the girt bar. In order to overcome the aforementioned unwanted bending of the girt bar during deployment of the slide, it was found to be desirable that the wide axis 62 of the girt bar be aligned with the load forces being reacted at the girt bar.

In order to achieve this, the girt bar 36 includes the middle portion 38 having a vertical end flange 65 (FIG. 6) attached to opposite ends thereof with one cylindrical end fitting 42 extending from each end flange. As shown in FIG. 7, the cylindrical end fitting 42 is located off center on the end flange 65. That is, the end fitting 42 is located entirely to the left of an imaginary vertical centerline 66 (FIG. 7) which equally divides the end flange 65 so that the end fitting 42 is on the opposite side from the escape slide which extends from the right edge of the girt bar.

More precisely, a load in any direction, except along the wide axis 62 (FIG. 6) produces a moment which is equal to the load value (in the direction of an arrow 70) times the eccentricity e (FIG. 7) of the end fitting 42; the eccentricity e being defined as the distance between the center of rotation of the end fitting 42 and an imaginery line extension of the girt 37. The resulting moment causes the girt bar to rotate such that the wide axis 62 of the girt bar is always aligned with the load from the slide. In this manner, the girt bar is caused to rotate so that the large part of the bar reacts the load forces which are transmitted from the escape slide.

What is claimed is:

1. An emergency escape slide system for an airplane, the system comprising:
    a. an escape slide having an upper end and a lower end;
    b. an attachment bar, having a first axis and a second axis which is perpendicular to the first axis, and which is connected to the upper end of the escape slide, the attachment bar including a (i) middle section having a rectangular cross sectional configuration and a first portion which has a first substantial alignment component which is parallel to the first axis and which has a first dimension, and a second portion which has a second substantial alignment component which is parallel to the second axis and which has a second dimension which is smaller than the first dimension, and (ii) first and second cylindrically configured end sections which are attached to opposite ends of the middle section; and
    c. means, connected to the airplane, for engaging the first and second end sections so as to attach the attachment bar to the airplane in a manner that when the escape slide is subjected to a force during deployment of the escape slide from the airplane, the attachment bar is permitted to rotate about the first axis such that the first substantial alignment component of the attachment bar is generally aligned with the force.

2. The system as set forth in claim 1 wherein:
    a. the middle section has a central lengthwise axis; and
    b. the first and second end sections are attached to the middle section in a manner that the first and second end sections are offset from a central axis of the middle section such that the attachment bar rotates in an eccentric manner.

3. An element for attaching an emergency escape slide to an airplane having an attachment receptacle connected to the airplane, the element comprising:
    a. a middle section which is connected to the escape slide and which has a first axis and a second axis which is perpendicular to the first axis, the middle section having a rectangular cross sectional configuration and a first portion which has a first substantial alignment component which is parallel to the first axis and which has a first dimension, and a second portion which has a second substantial alignment component which is parallel to the second axis and which has a second dimension which is smaller than the first dimension; and
    b. first and second cylindrically configured end sections which are attached to opposite ends of the middle section and which are engaged by the attachment receptacle so as to attach the attaching element to the airplane in a manner such that when the escape slide is subjected to a force during deployment of the escape slide from the airplane, the attachment element is permitted to rotate about the first axis such that the first substantial alignment component of the attaching element is generally aligned with the force.

4. The system as set forth in claim 3 wherein:

a. the middle section has a central lengthwise axis; and
b. the first and second end sections are attached to the middle section in a manner that the first and second end sections are offset from a central axis of the middle section such that the element rotates in an eccentric manner.

* * * * *